J. F. MARDIS.
RUNNING GEAR, ROUGH ROAD, BUGGY COUPLING.
APPLICATION FILED AUG. 30, 1915.
1,257,087.
Patented Feb. 19, 1918.
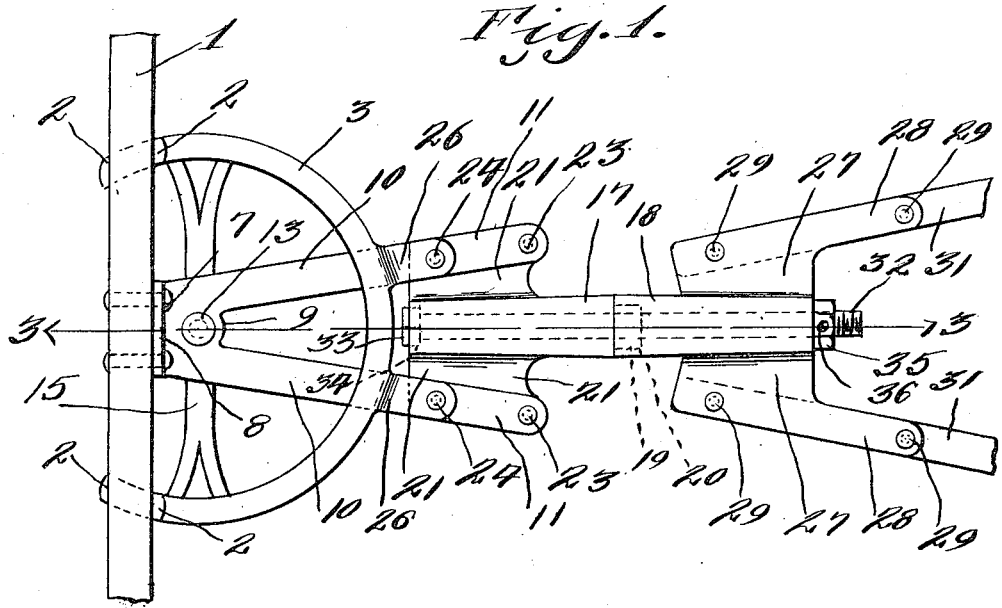
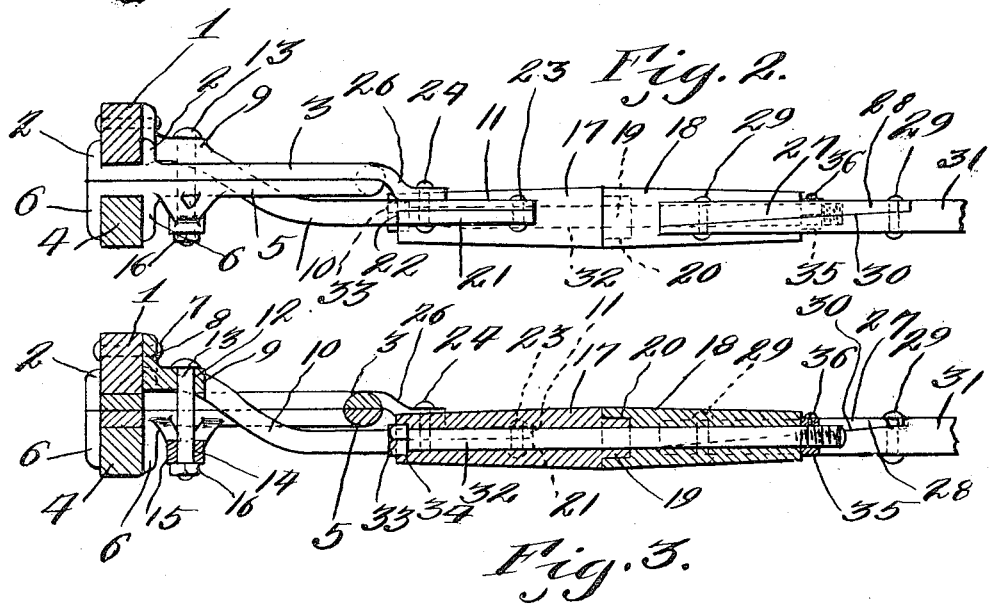
Witnesses
Frances G. Boswell
Philip Terrell
Inventor
J. F. Mardis.
By D. Swift & Co
his Attorneys

UNITED STATES PATENT OFFICE.

JAMES F. MARDIS, OF HARDIN, KENTUCKY.

RUNNING-GEAR, ROUGH-ROAD-BUGGY COUPLING.

1,257,087. Specification of Letters Patent. Patented Feb. 19, 1918.

Application filed August 30, 1915. Serial No. 48,039.

*To all whom it may concern:*

Be it known that I, JAMES F. MARDIS, a citizen of the United States, residing at Hardin, in the county of Marshall, State of Kentucky, have invented a new and useful Running-Gear, Rough-Road-Buggy Coupling; and I do hereby declare the following to be a full, clear, and exact description of the invention, such as will enable others skilled in the art to which it appertains to make and use the same.

This invention relates to the running gear of a vehicle, and particularly to an improved connection between the fifth wheel running gear and the rear running gear, and an object of the invention is to provide a connection of this character, so that in case the front or fifth wheel running gear or the rear running gear becomes damaged or injured beyond repair, it may be removed, and a new front or fifth wheel running gear or rear running gear may be substituted.

Another object of the invention is the provision of a connection of this nature, which permits the rear running gear to have a swivel action relative to the front running gear and vice versa.

In practical fields the details of construction may necessitate alterations falling within the scope of what is claimed.

The invention includes further features and combination of parts, as hereinafter set forth, shown in the drawing and claimed.

In the drawings:—

Figure 1 is a plan view of a portion of the front or fifth wheel running gear, and a part of the rear running gear, showing the improved connections between the two.

Fig. 2 is a side elevation of Fig. 1, showing the axle and front bolster in section.

Fig. 3 is a sectional view on line 3—3 of Fig. 1.

Referring more especially to the drawings 1 designates the front bolster, to which as shown at 2 the ends of the upper partial circular section 3 of the fifth wheel are secured, whereas 4 denotes the front axle, to which the lower corresponding partial circular section 5 of the fifth wheel is secured as shown at 6 in a suitable manner. The upper and lower sections of the fifth wheel coöperate with one another, so that the front axle may be guided uniformly when turning in one direction or the other. Secured at 7 to the front bolster is the vertical flange 8 of the forward part 9 of the forward hounds 10 of the front running gear. These hounds 10 curve downwardly and rearwardly through the fifth wheel, and are arranged to diverge rearwardly, and terminate in thin plates 11. The forward portion 9 of the front hounds is provided with an opening or an aperture 12, to receive the pivot bolt or king pin 13, which also extends through an opening or an aperture 14 of a transverse bar 15, which integrally connects the opposite sides of the lower sections of the fifth wheel. A nut 16 is threaded on the lower end of the bolt or king pin 13, in order to hold the upper and lower sections of the fifth wheel concentrically connected, and in such wise as to permit the upper and lower connections to freely turn. The joint as a whole between the front and rear hounds consists of the two axially arranged sleeves 17 and 18. The sleeve 17 has an extension 19 fitting a socket 20 in the sleeve 18, to assist in holding the sleeves axially and swivelly joined. The front sleeve 17 is formed with laterally extending plates 21, which are received in the cutaway portions 22, of the rear parts of the forward hounds, and are bolted or otherwise secured at 23 and 24 to the plates 11, thereby connecting the sleeve 17 to the rear part of the front hounds. The upper section 3 of the fifth wheel is provided with rearwardly extending lugs or ears 26, which are also secured at 24 upon the upper faces of the plates 11. The rear sleeve 18 is provided with laterally extending plates 27 having rear extensions 28, which extensions and the outer portions of the plates 27 are secured at 29 in the recesses or cutaway portions 30 of the forward ends of the rear hounds 31, thereby connecting the rear sleeve 18 to the rear hounds. An elongated bolt 32 extends through the sleeves and holds them axially connected, so that one sleeve may swivel relatively to the other. The head 33 of the bolt 32 is partially counter sunken as shown at 34 in the forward ends of the sleeve 17, thereby preventing the bolt from turning. A nut 35 is threaded upon the rear end of the bolt and adjacent the rear end of the sleeve 18, to hold the two sleeves axially joined, there being a set screw 36, threaded through the nut 35, to bite into the threads of said bolt 32, to lock the nut against turning or unscrewing.

The invention having been set forth what is claimed as new and useful is:

In a running gear, a combination with a fifth wheel having upper and lower fifth wheel members, the upper member having a pair of rearwardly projecting radial lugs, a bolster and an axle fixed to said members respectively, a forward hound element connected to said bolster, a king pin passing through said hound element and the lower fifth wheel member, said hound element extending downwardly through and below the fifth wheel and having extensions projecting radially rearwardly beyond the fifth wheel for securement to said lugs, a coupling element having its bore at right angles to the king pin and provided with lateral wings, means for securing said lugs, the extensions and the wings together, means for securing the extremities of said extensions to said wings, a second coupling element with its bore alined axially with the bore of the first coupling element and having lateral wings, means for swivelly connecting said coupling elements, and rear hound members connected to the wings of the second coupling element.

In testimony whereof I have signed my name to this specification in the presence of the subscribing witnesses.

JAMES F. MARDIS.

Witnesses:
   D. E. BOOKER,
   E. H. PACE,
   H. B. NEALE.

Copies of this patent may be obtained for five cents each, by addressing the "Commissioner of Patents, Washington, D. C."